United States Patent
Sundaram et al.

(10) Patent No.: US 6,564,341 B1
(45) Date of Patent: May 13, 2003

(54) CARRIER-GRADE SNMP INTERFACE FOR FAULT MONITORING

(75) Inventors: Shobana S. Sundaram, Arlington Heights, IL (US); Jingdong Liu, Nepean (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/444,344

(22) Filed: Nov. 19, 1999

(51) Int. Cl.[7] .............................................. G06F 11/00
(52) U.S. Cl. .......................................... 714/43; 370/241
(58) Field of Search ............................. 714/43, 44, 47, 714/48, 56, 819, 821, 39, 25; 370/241, 242, 252, 254; 710/15, 17

(56) References Cited

U.S. PATENT DOCUMENTS

| | | | | |
|---|---|---|---|---|
| 5,648,966 A | * | 7/1997 | Kondo et al. ................ | 370/245 |
| 5,696,486 A | * | 12/1997 | Poliquin et al. ............. | 340/506 |
| 5,774,640 A | * | 6/1998 | Kurio ............................ | 371/7 |
| 5,777,549 A | | 7/1998 | Arrowsmith et al. ........ | 340/506 |
| 5,951,648 A | | 9/1999 | Kailash ......................... | 709/237 |
| 5,959,969 A | * | 9/1999 | Croslin et al. ............... | 370/216 |
| 6,006,016 A | * | 12/1999 | Faigon et al. ........... | 395/185.01 |
| 6,138,049 A | * | 10/2000 | McLaughlin .................. | 700/67 |
| 6,260,062 B1 | * | 7/2001 | Davis et al. .................. | 709/223 |
| 6,336,139 B1 | * | 1/2002 | Feridun et al. .............. | 709/224 |
| 6,349,325 B1 | * | 2/2002 | Newcombe et al. ......... | 709/202 |
| 6,370,572 B1 | * | 4/2002 | Lindskog et al. ........... | 709/200 |

* cited by examiner

*Primary Examiner*—Nadeem Iqbal
(74) *Attorney, Agent, or Firm*—Pearne & Gordon LLP

(57) ABSTRACT

A method, system and apparatus enables carrier-grade network fault monitoring in an unreliable network transport environment. An element manager of the system is adapted for formulating and sending notifications through the unreliable network transport environment, each notification having an unique transmitted notification serial number (TxNSN). A network manager is operatively connected for bi-directional communication with the element manager. The network manager includes a detection mechanism responsive to notifications received from the element manager to detect a missing notification on the basis of the respective TxNSNs of received notifications; and a polling mechanism responsive to detection of a missing notification to send a polling request to the element manager for transmission of a response containing data related to the missing notification. The advantage is simple, easily managed, carrier-grade network fault monitoring without overloading the unreliable network transport environment.

45 Claims, 11 Drawing Sheets

EMS - MIB 10

| CURRENT NOTIFICATION SEQUENCE NUMBER | NOTIFICATION LOG TABLE | ACTIVE ALARMS | SysUpTime | NE INVENTORY TABLE | STATE INFORMATION TABLE |
|---|---|---|---|---|---|
| • COUNTER<br>• ASSIGN TO NOTIFICATION AS TRANSMITTED NOTIFICATION SEQUENCE NUMBER (TxNSN) | • HISTORY OF SENT NOTIFICATIONS<br>• INDEXED BY TxNSN | • CURRENT ALARMS | • ELAPSED TIME SINCE LAST EMS RESTART | • ID<br>• TYPE<br>• ADDRESS | • ADMINISTRATIVE<br> - LOCKED<br> - UNLOCKED<br> - SHUTTING DOWN<br>• OPERATIONAL<br> - ENABLED<br> - DISABLED<br>• UNKNOWN |
| 22 | 24 | 26 | 28 | 30 | 32 |

FIG. 4

NMS - MIB 16

| LAST PROCESSED NOTIFICATION SEQUENCE NUMBER | NE INVENTORY TABLE | STATE INFORMATION TABLE | ACTIVE ALARMS |
|---|---|---|---|
| • COUNTER<br>• UPDATE FROM CNSN | • ID<br>• TYPE<br>• ADDRESS | • ADMINISTRATIVE<br>  - LOCKED<br>  - UNLOCKED<br>  - SHUTTING DOWN<br>• OPERATIONAL<br>  - ENABLED<br>  - DISABLED<br>• UNKNOWN | • CURRENT ALARMS |
| 34 | 36 | 38 | 40 |

FIG. 5

CARRIER-GRADE SNMP INTERFACE FOR FAULT MONITORING

CROSS-REFERENCE TO RELATED APPLICATIONS

This is the first application filed for the present invention.

MICROFICHE APPENDIX

Not applicable.

TECHNICAL FIELD

The present invention relates to Network Management Systems, and in particular to a method and system for enabling reliable network fault monitoring in an inherently unreliable network transport environment.

BACKGROUND OF THE INVENTION

The conventional network space comprises a layered architecture of a network transport fabric comprising Network Elements (NEs) (e.g., switches, routers etc.) for end-to-end transport of payload data across the network, and a network management layer for controlling operation of the NEs and providing network administrative services.

Network Management Architecture

A typical network management model includes: Management Stations; a Management Information Base (MIB); Management Agents; and a Management Protocol.

Management Stations are also known as network managers, and may comprise stand-alone devices and/or a distributed platform which communicate with one or more Management Agents. Management Stations typically have a set of management applications for monitoring, analyzing and presenting management data. They may also provide a user interface and access point for human operators.

A Management Information Base (MIB) is a collection of managed objects. Each MIB object is generally defined as a data variable representing network resources, resource components, as well as their respective attributes, status and performance statistics. MIBs represent the data model of the network, and typically provide an open interface for multi-vendor inter-operability.

Management Agents typically implement the MIB for the managed resources in their context, and support the required protocol interactions with the Management Stations. These agents may also serve as proxies for devices that do not have the capability to support the standard protocol suite.

The Management Protocol specifies interaction models between the Management Stations and the Management Agents via operation directives and notification mechanisms. This includes predefined message sets exchanged between a manager and an agent.

Within the above-described network management model, the Management Stations are conveniently divided into Network Management Systems (NMSs), and Element Management Systems (EMSs). Each EMS is connected to one or more NEs, and operates to manage the operation of the NEs within its domain. Each EMS interfaces with an NMS which operates to provide end-to-end network administration and management functionality (including, where applicable, user interfaces for human operators).

Currently, three major standards organizations are working on standards for network management systems. They include: Internet Engineering Task Force (IETF); Open Systems Interconnection (OSI); and, International Telecommunications Union-Telecommunications Standards Sector (ITU-TS). The standard adopted by ITEF is the Simple Network Management Protocol (SNMP). SNMP is designed for enterprise data communications networks, and its flexibility and simplicity make it the most popular standards implemented in such networks. The OSI and ITU-TS are each working on a standard called "Common Management Information System (CMIS). CMIS is an object-oriented network/system management solution with well-defined management objects information and is recommended as a solution for carrier-grade network management.

SNMP is a set of standards for network management that includes: a Management Protocol; a MIB specification methodology; and administrative control to handle manager-agent interactions. SNMP resides at the application layer of the OSI model and is typically implemented over an unreliable transport service, namely the User Datagram Protocol (UDP), which is a connectionless protocol over Internet Protocol (IP). SNMP has undergone a number of revisions to provide functional enhancements. For example, SNMP v2c enhances the SMI, offers manager-to-manager notification capability, defines powerful protocol operations and an elaborate set of return codes. SNMP v3 augments SNMP v2 by introducing a security and administration framework.

As mentioned above, UDP is a connectionless protocol over IP, so delivery of SNMP notifications transmitted between an EMS and an NMS over UDP cannot be guaranteed. This inherent unreliability of the network signaling environment precludes carrier-grade reliable network management.

Accordingly, there is a need for systems for enabling carrier-grade reliable network management in an inherently unreliable network transport environment.

Network Management Areas

Network management includes the following five functional areas:

1) Fault management;
2) Performance management;
3) Accounting;
4) Configuration; and
5) Security management.

Each functional area includes many related management functions. One important function of fault management is fault monitoring. The fault monitoring function detects the failure of systems to meet their operational objectives. Fault monitoring is the basis for further fault diagnosis and correction. Fault monitoring is always important, especially in a carrier-grade network. A carrier-grade fault monitoring system must conform to a few basic criteria:

a) 100% Reliability—Any method and system designed for achieving the carrier grade network management should provide 100% reliability in collecting and receiving network fault information.

b) Synchronization—The monitoring system must define a procedure to keep the monitoring system and the monitored system in synchronization with respect to the fault information at a given point. Synchronization includes:
      a. initial startup synchronization
      b. lose/regain communication synchronization
      c. continuous out-of-synchronization recovery c) Sequence—To avoid corrupting the integrity of alarm information. It is generally necessary to process the alarm information in time sequence. The managed system should send alarm information in the time sequence. The management system should also process alarm events in time sequence.

d) Timeliness—The mechanism should permit the recovery of lost alarm information in a timely fashion (within the tolerance of network management requirements).

e) Efficiency—The network traffic involved in achieving reliable fault monitoring should be kept as low as possible. Generally, the network management traffic should not consume more than about 5% of network capacity under normal conditions.

f) Standards Based Open Interface—The interface defined and employed by the system should adhere to certain standards to achieve the maximum openness.

Issues Related to Fault Monitoring

Due to the recent convergence of data communications and telecommunications, as well as the high cost of CMIS, network administrators have begun to use SNMP to manage carrier-grade networks. As mentioned above, the SNMP has great flexibility and simplicity. To achieve the flexibility and the simplicity, SNMP has not standardized what should be defined in the MIB.

However, OSI/ITU-T standards specify useful management information that is appropriate for carrier grade fault monitoring. There therefore exists a need for an SNMP MIB that includes key management data to provide a richer data model that is more functional and useful for reliable fault monitoring. As mentioned above, SNMP is typically implemented over UDP, which offers no transport service guarantees, and this inherent unreliability challenges carrier-grade fault monitoring.

There therefore exists a need for an innovative solution to defining the required MIB data and specifying expected behavior in the application layer protocol engines of management system to ensure accurate data synchronization under various network conditions.

SUMMARY OF THE INVENTION

An object of the present invention is to provide a system for enabling carrier-grade reliable fault monitoring using a simple, inherently unreliable management protocol such as SNMP by incorporating the surveillance data specified by the OSI/ITU-TS standards for the MIB definition, as well as a mechanism for ensuring reliability.

Accordingly, an aspect of the present invention provides a method of enabling reliable network fault monitoring using an unreliable network management protocol, such as SNMP, for example. The method includes the steps of: receiving notifications sent over the unreliable network transport environment, each notification having a unique transmitted notification sequence number (TxNSN); detecting a missing notification on the basis of the respective TxNSN's of received notifications; and sending a polling request for the missing notification.

Another aspect of the invention provides guidelines for converting a well-defined network management information model into a MIB for use in a simple network management protocol, and for using the information in management operations between the management system and the managed system. The managed objects and their container relationship defined the OSI/ITU-TS standards are captured and stored in the simple network management protocol MIB, or sent along with the notifications. A subset of the object attributes defined in the OSI/ITU-TS standards are captured and stored in the simple network management protocol MIB are sent along in the notifications.

Another aspect of the present invention provides a system for enabling carrier-grade network fault monitoring in an unreliable network transport environment. The system includes a first manager which is an Element Management System (EMS), and a second manager which is a Network Management System (NMS). The first manager is operatively connected for bidirectional communication over the unreliable network transport environment. The first manager collects and stores management information (objects and their attributes) in the MIB. The first manager is adapted to formulate and send notifications over the unreliable network transport environment, each notification including the required attributes, and having a unique transmitted notification sequence number (TxNSN). The second manager is operatively connected for bi-directional communication with the first manager over the unreliable network transport environment. The second manager comprises: detection means responsive to notifications received from the first manager detecting a missing notification on the basis of the respective TxNSN's of received notifications; and polling means responsive detection of a missing notification for sending a polling request to the first manager for retrieving data from the missing notification; and, synchronization means for initial and continuing fault information synchronization with the first manager.

A further aspect of the invention provides a manager for enabling reliable management in an unreliable network transport environment in which the manager comprises an interface operatively connected for reception of management data from a managed resource within a management domain of the manager. A notification entity is responsive to the received management data and formulates a notification indicative of the received management data. The notification includes a respective unique transmitted notification sequence number.

A still further aspect of the invention provides a manager for enabling reliable management in an unreliable network transport environment in which the manager comprises synchronization means for initial synchronization with the managed system; and, detection means for detecting notifications received over the unreliable network transport environment. Each notification includes a respective unique transmitted notification sequence number (TxNSN). The detection means is adapted to detect a missing notification on the basis of the respective TxNSN's of the received notifications. Polling means for detecting a missing notification and sending a polling request for the missing notification; and, polling means for detecting communications loss and for detecting re-establishment of operations and management (OAM) communications and sending appropriate requests for overall management data re-synchronization.

In one embodiment of the invention, the first manager comprises an interface operatively connected for reception of management data from a managed resource within a management domain of the first manager. A notification entity responsive to the received management data formulates a notification indicative of the received management data. Preferably, the notification entity is responsive to the management data and formulates a notification corresponding to a selected one of a set of predetermined notification types. In a preferred embodiment, the set of predetermined notification types comprises any one or more of: Enrol Notifications; De-enrol Notifications; State Change Notifications; Attribute Change Notifications; and Alarm Notifications.

In another embodiment of the invention, the first manager further comprises a first management information base that includes a current notification sequence number; and a notification log. Preferably, the first management information base further includes information respecting one or more of: an identity of a managed resource within the management domain; a state of the managed resource; and alarm notifications sent by the first manager.

The notification entity preferably increments the current notification sequence number to a next higher value after assigning a notification sequence number to a TxNSN of a notification.

In an embodiment of the invention, following transmission of a notification to the second manager, the first manager is adapted to back-up contents of the transmitted notification in the notification log.

The interface of the first manager is preferably adapted to detect a plurality of predetermined alarm events, and store the alarm events in the MIB. The first manager preferably further comprises a buffer for temporarily storing notifications sent over the unreliable network transport.

The second manager preferably further comprises a second management information base including: a last processed notification sequence number; information respecting an identity of managed resources within a domain of the first management system; and, a state of each managed resource. Preferably, the second management information base further comprises information respecting alarms raised by the first manager.

The second network manager is preferably further adapted to process a received notification if its TxNSN is consecutively larger than a value of the last processed notification sequence number. Upon processing the notification, the second manager preferably increments a last processed notification sequence number to a next larger consecutive value. Preferably, the second manager is further adapted to discard a received notification if its TxNSN is less than or equal to a value of the last processed notification sequence number. If the TxNSN is greater than the value of the last processed notification sequence number by more than one, the second manager is further adapted to initiate recovery polls to retrieve the data from the lost notifications.

During either of a start-up or a restart operation of the first manager, the notification entity is preferably adapted to formulate a cold-start notification and transmit the cold-start notification to the second manager. The second manager is also adapted to detect restarts by querying the sysUPTime variable and exhibits behavior similar to that described above. Restart recovery procedures are not based solely on an unreliable coldstart notification.

During either one of a start-up operation of the second manager, or recovery of communications between the second manager and the first manager, the second manager is further adapted to control the polling means for sending a polling request to the first manager requesting the value of the current notification sequence number. Upon reception of the requested information extracted from the first manager, the second manager initializes the last processed notification sequence number to equal the value of the current notification sequence number. Preferably, following initialization of the last processed notification sequence number, the second manager is adapted to control the polling means for sending polling requests to the first manager requesting transmission of notifications containing data extracted from the first management information base. The second network manager updates its local management information with the information contained in subsequently received response messages containing the requested data from the first management information base.

BRIEF DESCRIPTION OF THE DRAWINGS

Further features and advantages of the present invention will become apparent from the following detailed description, taken in combination with the appended drawings, in which:

FIG. 4 schematically illustrates elements of an EMS management information base (MIB), in accordance with an embodiment of the present invention;

FIG. 5 schematically illustrates elements of an NMS management information base (MIB), in accordance with an embodiment of the present invention;

It will be noted that throughout the appended drawings, like features are identified by like reference numerals.

DETAILED DESCRIPTION OF THE PREFERRED EMBODIMENT

This invention provides a method of applying a carrier-grade standardized information model (such as the Open Systems Interconnection (OSI) or International Telecommunications Union-Telecommunications Standards Sector (ITU-TS) recommendations) to a simple network management protocol (such as Simple Network Management Protocol (SNMP)) domain. This enables a simple, cost-effective network fault monitoring system that provides carrier-grade reliability using an inherently unreliable network transport protocol for network fault monitoring.

Figure 1:
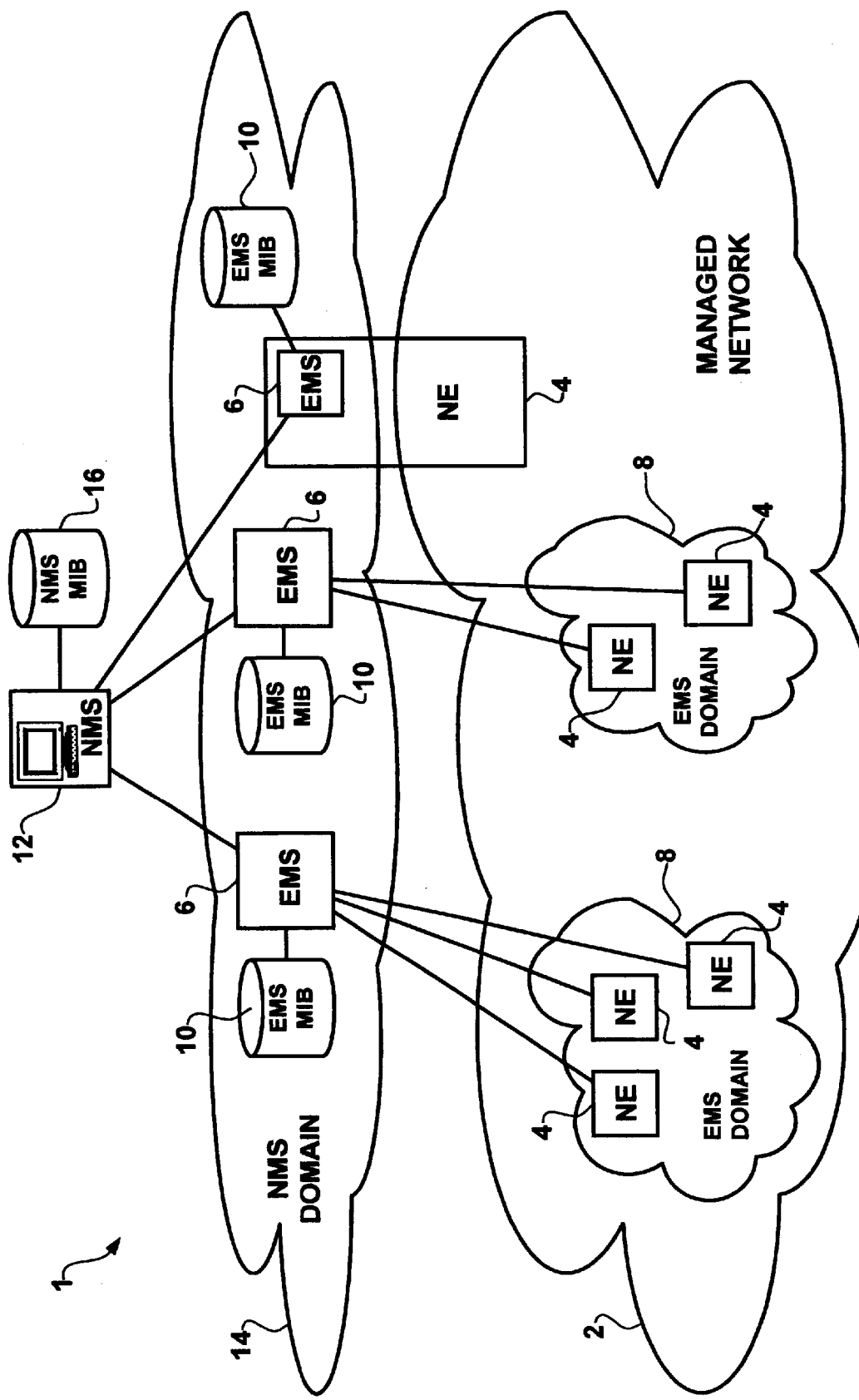
FIG. 1 schematically illustrates a managed communications network in accordance with an embodiment of the present invention.

As shown in FIG. 1, the present invention provides a system 1 enabling carrier-grade reliable network management of a managed communications network 2 (such as, for example the Internet) composed of a plurality of network elements 4 (NEs) which are interconnected by respective links (not shown). The system 1 comprises a plurality (three are shown in the illustrated embodiment) of first managers 6 (e.g. Element Management System [EMS] agents) connected to one or more respective NEs 4 to facilitate direct management and control of each NE 4 within the managed network 2. Each EMS agent 6 has a respective EMS-domain 8 which encompasses a set of NEs 4 managed by that EMS agent 6. Thus the managed network is divided into a plurality of EMS domains 8, each of which encompasses one or more respective NEs. In order to facilitate management of the NEs 4 within its domain, each EMS-agent 6 maintains a respective EMS Management Information Base (EMS-MIB) 10, which will be described below in more detail.

End-to-end management across the network 2 is provided by one or more second managers 12 (e.g. Network Management Systems [NMSs]—only one is shown in FIG. 1), each of which is connected to one or more respective EMS agents 6. Like the EMS agents 6, each NMS 12 has a respective NMS domain 14 which encompasses the set of EMS agents 6 connected to that NMS 12. In order to facilitate management of the EMS agents 6 within its domain, each NMS 12 maintains a respective NMS Management Information Base (NMS-MIB) 16, which will be described below in more detail.

Figure 2:
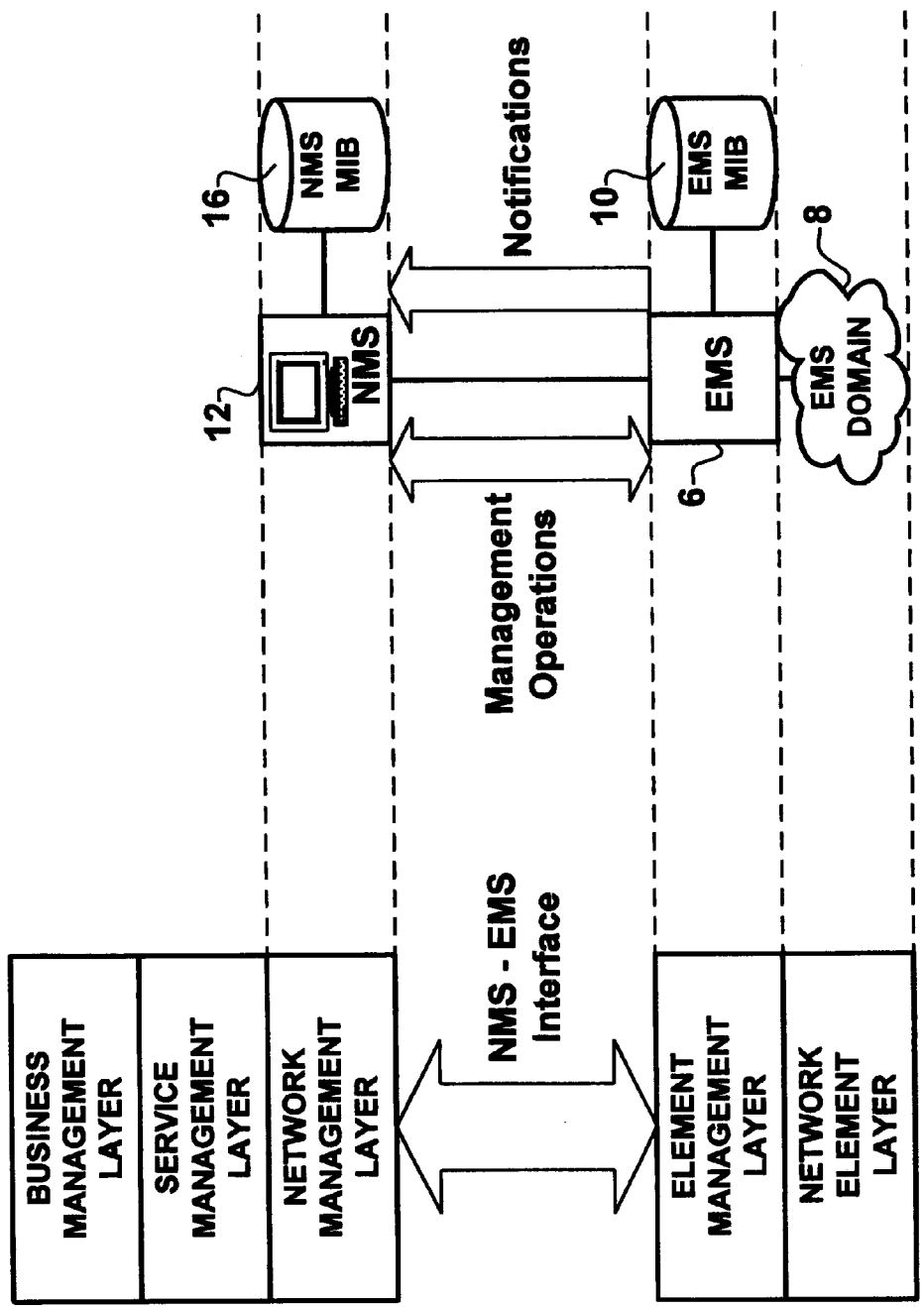
FIG. 2 schematically illustrates a layered architecture of logical functionality operable in the managed communications network of FIG. 1.
Figure 3:
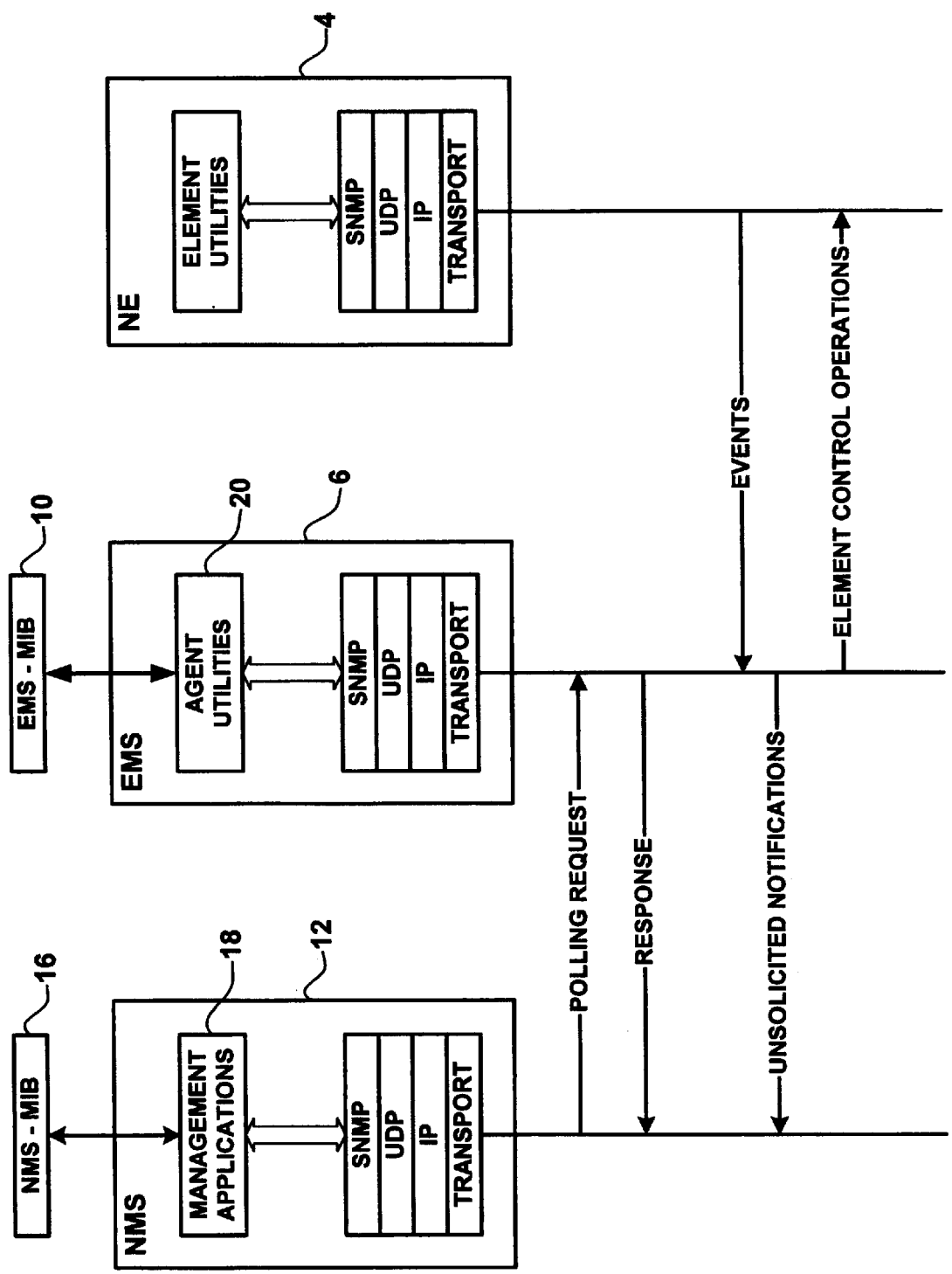
FIG. 3 schematically illustrates a layered architecture of messaging between an NE, an EMS and an NMS in the managed communications network of FIG. 1.

As shown in FIGS. 2 and 3, the network management system 1 provides a layered architecture of network management functionality. Business management, service management and network management functionality are provided by management applications 18 of the NMS 12. Element management functionality (e.g., management and control of individual NEs 4) is provided by EMS agent utilities 20, which communicate with management applications 18 in the NMS 12. Communication between each EMS agent 6 and its associated NMS 12 is handled using SNMP messaging over UDP transport services. Signaling between the EMS agent 6 and the NMS 12 is typically accomplished using SNMP Polling Request/Response cycles initiated by the NMS 12, and unsolicited SNMP notifications sent by the EMS agent 6 to the NMS 12. The unsolicited SNMP notifications will normally be triggered by reception of an NE event notification by the EMS agent 6.

The conventional signaling scheme illustrated in FIG. 3 has the advantage of reducing EMS-NMS signal traffic, but, because delivery of notifications using UDP is not guaranteed, the system is inherently unreliable. In the case of Polling Request/Response cycles initiated by the NMS 12, failure of the UDP to deliver a message is detectable by lack of an expected response within a predetermined time-out period. However, in general, the NMS 12 has no way of directly detecting a failure of the UDP to deliver an unsolicited notification.

In accordance with the present invention, each EMS agent 6 maintains a respective EMS-MIB 10 containing information concerning the identity and status of each NE 4 within its domain 8. As shown in FIG. 4, in an embodiment of the present invention, the EMS-MIB 10 includes:

- a Current Notification Sequence Number (CNSN) 22, which is preferably an integer value used for indexing each notification sent by the EMS agent 6;
- a Notification Log Table 24, which records details of notifications sent by the EMS agent 6 to the NMS 12, indexed by a respective transmitted Notification Sequence Number (TxNSN) assigned to each notification;
- an Active Alarm Table 26, which records details of any active alarms registered by the EMS agent 6, (i.e. alarms raised by the EMS agent 6 but not yet cleared);
- a sysUpTime 28 that stores time elapsed since the last restart of the EMS AGENT 6;
- an NE Inventory Table 30, which records details of the identity of each NE 4 within the respective EMS-domain 8; and
- a State Information Table 32, which records details of the status of each NE 4 within the respective EMS-domain 8.

Similarly, each NMS 12 maintains a respective NMS-MIB 16 containing summarized information concerning the identity and status of the NEs 4 under each EMS agent 6 within the NMS-domain 14. As shown in FIG. 5, in an embodiment of the present invention, the NMS-MIB 16 includes:

- a last processed notification sequence number 34;
- an NE Inventory Table 36, which records details of the identity of each NE 4;
- a State Information Table 38, which records details of the status of each NE 4; and
- an Active Alarm Table 40, which records details of any active alarms (i.e. alarms raised by the EMS agent 6 but not yet cleared).

The data recorded in the EMS-MIB 10 (FIG. 4) is obtained by the respective EMS agent 6 by monitoring each NE 4 within its respective EMS-domain 8. This may be accomplished in real-time, or near-real-time. Enablement of reliable network management is primarily based on maintaining synchronization between the data of the EMS-MIB 10 and the NMS-MIB 16. According to the present invention, this data synchronization is accomplished by means of unsolicited notifications issued by the EMS agent 6, and recovery polling (Polling request/response cycles) initiated by the NMS 12 to recover lost or missing data. Detection of lost notifications is based on a unique sequential value (the TxNSN) which is associated with each notification. As will be described in greater detail below, the NMS 12 can detect missing notifications by monitoring the respective TxNSN of each successively received notification.

Thus in a preferred embodiment of the present invention, each unsolicited notification sent by the EMS agent 6 includes a unique TxNSN. Upon receipt of the notification, the management applications 18 of the NMS 12 extract the TxNSN, and compare it to the respective TxNSNs of previously received notifications received by the NMS 12 in order to detect instances of missing notifications (i.e. notifications sent by the EMS agent 6 but not received by the NMS 12). If a missing notification is detected, the NMS 12 polls the EMS agent 6 for the missing data.

The following provides a detailed description of exemplary notification and polling/response operations, usable in the present invention. This is followed by signaling walk-throughs illustrating exemplary behavior of EMS agent 6 and NMS 12 in accordance with an embodiment of the invention.

Notifications

Conventional Simple Network Management Protocol (SNMP) V2 notifications can be used to communicate unsolicited notifications from the EMS agents 6. These notifications generally communicate data indicative of an event occurring at an NE 4, along with qualifying information provided by a list of variable bindings. Each variable binding includes a variable identifier and its value. For all SNMP v2 notifications, the first two variable bindings in the list are preferably the sysUpTime and the snmpNotificationOID, respectively. Additionally, according to the present invention, every notification also includes a unique transmitted notification sequence number (TxNSN) and OSI/ITU-TS standardized object attributes. The common variable bindings are explained below.

sysUpTime—Conventional EMS agent 6 sysUpTime, count since last re-start(e.g. in hundredths of seconds).

SnmpNotificationOID—a value uniquely identifying the type of notification.

Transmission Notification Sequence Number (TxNSN)—A monotonically increasing integer (e.g., 32 bit). The TxNSN is set equal to the Current Notification Sequence Number (CNSN) during formulation of a notification, plus one. The CNSN is incremented by one for each outgoing notification, irrespective of the category of the notification.

The present invention uses the following five principal types of notifications (as identified by the snmpNotificationOID), each of which is discussed below:

NE Enrol Notifications
NE De-enrol Notifications
NE OSI State Change Notifications
NE attribute change Notifications
Alarm Notifications

NE Enrol Notifications

Once the initial synchronization between NMS 12 and EMS agent 6 is complete (e.g., following start-up of the NMS 12), the EMS agent 6 sends an NE-enrol notification to the NMS 12 when a new network element (NE) 4 is added to its management domain 8. This enables the NMS NE Inventory Table 36 to be maintained consistent with the NE Inventory Table 30 of the EMS-MIB 10 (FIG. 4).

Besides the common variable bindings, the following OSI/ITU-TS standardized object attributes can be provided with an NE-enrol notification:

NE name—A name/label to uniquely identify the NE 4 in the EMS domain 8 across all NE types managed by the EMS 6. This is object identifier attribute defined in the OSI/ITU-TS standards.

NE Administrative State—This variable indicates the current administratively assigned state of the NE 4, which may be for example "locked", "unlocked" or "shutting down" as defined in OSI/ITU-TS standards.

NE Operational State—This indicates whether the NE 4 is enabled or disabled.

NE Unknown Status—This variable indicates whether the NE 4 is presently considered to have an unknown status. This status indicates whether the EMS agent 6 can perform OAM communications with the managed NE 4.

NE De-enrol Notifications

The EMS agent 6 sends an NE De-enrol Notification to the NMS 12 whenever an existing NE 4 is removed from its EMS domain 8 and no longer needs to be managed. This enables the NMS 12 to remove data entries related to the de-enroled NE from its NMS-MIB 16. Besides the common variable bindings, the following OSI/ITU-TS standardized attributes can be provided with an NE De-enrol Notification:

NE name—A name/label that uniquely identifies an NE in the EMS domain 8 across all NE types managed by the EMS agent 6. The name is the same as the string used to enroll the NE. This is object identifier attribute defined in the OSI/ITU-TS standards.

NE State Change Notifications

Whenever the operational state of an NE 4 or the administratively assigned state of the NE 4 changes, the EMS agent 6 notifies the NMS 12 of the new state. Changes in the value of the NE "unknown" status are preferably also communicated to the NMS 12 via this notification. This notification preferably includes (in addition to the common variable bindings) the following OSI/ITU-TS standardized object attributes:

NE Operational State—indicates whether the NE is enabled or disabled;

NE Unknown Status—indicates whether the NE is presently considered to be at an "unknown" status. If the status is unknown, the EMS agent 6 cannot perform OAM communications with the managed NE 4; and NE Administrative State—indicates the current administratively assigned state of the NE 4, which could be, for example, "locked", "unlocked", or "shutting down".

NE Attribute Change Notifications

According to the present invention, the EMS agent 6 provides a few key attributes of NEs 4 to the NMS 12. When a value of one of these attributes changes, the EMS agent 6 notifies the NMS 12 about the change. This notification preferably includes (in addition to the common variable bindings) the following OSI/ITU-TS standardized object attributes:

NE Version Information—A displaystring variable containing the current software/hardware version of the NE 4. The description clause of this variable can specify how the string needs to be interpreted;

NE Vendor Name—A displaystring variable specifying a current vendor name for the NE;

NE Location Name—The name of the place where the NE 4 is currently located; and

Alarm Notifications

The EMS agent 6 notifies the NMS 12 of the occurrence of various problems in the NE 4, as well as when these problems are corrected. Alarm notification messages are preferably inhibited under circumstances where there is a possibility that the NMS 12 will be overloaded with notifications (notification storms). Some example situations are, after an EMS agent 6 re-starts, when an NE 4 recovers from an unknown status, etc. Preferred behaviors under various circumstances are described below in the sample walkthroughs which follow.

Alarm Raise Notifications

Four notifications (Critical, Major, Minor, Warning) categorized based on severity can be used to report the occurrence of a fault condition. All four notifications preferably have the following OSI/ITU-TS standardized object attributes (in addition to the common variable bindings):

Component Object Identifier—unambiguously identifies the specific component of the NE 4 that raised the alarm by supplying its Distinguished Name (DN). DNs are constructed by representing an entire component hierarchy in a category—value information model. Here, the category refers to the component type/class and the value refers to the instance as defined in OSI/ITU-TS standardized container relationship and object identifier;

Problem Category—a variable binding used to classify a problem by category (e.g., communications, quality of service, processing error, equipment, or environmental);

Notification Identifier—provides an integer (e.g., 32 bits) value to uniquely identify the alarm notification at an NE 4. This value will be used by subsequent notifications for correlation purposes. Any arbitrary notification Id can be used as long as it is unique within an NE 4 and the EMS agent 6 can derive the specific Notification Ids for correlation purposes. NMS 12 can use the component object identifier field to point to the specific unit in its alarm browser display;

Additional Text—a displaystring variable to contain a text description of the alarm condition;

Alarm Timestamp—a time at which the particular alarm condition happened at the NE 4, preferably represented as a time in seconds since a fixed reference epoch 00:00:00 (Jan. 1, 1970) so that the NMS 12 can deal with time zone differences;

Probable Cause—used to further qualify the alarm report with a cause that could have led to the alarm condition. Those EMS agents that cannot determine the cause may set this to a default value of "Unspecified Reason";

Specific Problem—a string parameter to provide further refinement of the Probable Cause. Each EMS agent 6 can define an interpretation scheme in an agent-capabilities statement of the MIB definitions; and List of Correlation Identifiers—a string variable containing a list of notification identifiers. A notification containing this field is correlated to the previous notifications related to the same NE object and any notification identifiers of previously reported alarms are specified in this list. The presence of this field enables a notification to override or implicitly clear a subset of previously reported alarms with the current alarm making an alarm associated with the notification.

Alarm Clear Notifications

Alarm clear notifications can be used to indicate that one or more previously reported problems have been cleared. In an alarm clear notification, the Correlation ID list field should contain the notification identifiers of one or more previously reported alarms that need to be removed from the active alarm Table 40 of the NMS-MIB 16. Other parameters such as the Component ID, description text, and timestamp are preferably supplied as variable bindings to the alarm clear notification, along with the usual variable bindings.

However, the Correlation ID list field should contain the notification identifiers of one or more previously reported alarms that need to be removed from the active alarm Table 40 of the NMS-MIB 16. Other parameters such as the Component ID, description text, timestamp and Correlation ID field are preferably supplied as variable bindings to the alarm clear notification, along with the TxNSN and the standard SNMP v2 variable bindings (i.e., sysUpTime and snmpNotificationOID).

In instances where it is not possible to correlate previous alarm notifications within an alarm clear notification, the Correlation ID field may be set to an empty string. The NMS 12 can then deal with uncorrelated alarm clears. However, this is preferably done only under exceptional circumstances because uncorrelated alarms are likely to be left in a suspended condition. The EMS agents 6 preferably correlate alarm clear notifications with previously reported alarms. It is preferable that the EMS agents 6 do not send uncorrelated alarm clears, because an active alarm display is a key feature of carrier-grade NMS 12 in accordance with the present invention. Table 1 summarizes various correlation scenarios supported by the present invention, assuming the same NE object instance in context.

Table 1 Summary of correlation scenarios

| Correlation Capability | Notification Id of Raise Alarms | Correlation Id List |
|---|---|---|
| One alarm raise with one correlated clear | Unique alarm fault code amongst all the possible values of notification IDs for the specific NE | The clear alarm's correlation ID field should contain the notification ID of the alarm raise |
| Multiple alarm raises with one correlated clear | Each alarm raise should contain a unique notification ID | The clear alarm's correlation ID list should contain multiple fields, with each field pointing to the notification ID of an alarm raise |
| Overriding alarm raise | All alarm raises should contain unique notification IDs | The latter alarm raise correlation ID list should point to the notification IDs of previous alarm raises |

Polling Management Data

SNMP, in general, recommends a polled management model to facilitate a well controlled network management traffic and to enable reliable data synchronization via a request—response interaction. In the present invention, polling is particularly useful for the following functions:

To recover missing data due to lost notifications. These are referred to as audit polls. If the EMS agent 6 is also polling the NEs 4 for fault status information, then the polling frequencies of the NMS 12 and EMS agent 6 should be aligned so as to make the NMS polls more purposeful.

To perform initial data synchronization for NE inventory, state information and active alarms list.

To monitor the status of OAM communications with the EMS agents 6 and resynchronize all data after recovering from communications loss.

Regular Auditing

The primary task of the auditing is to keep the synchronization between NMS 12 and EMS agents 6. In order to do this, the NMS 12 needs to continuously exchange management information with the EMS agents 6. In order to limit the volume of network management traffic, it is necessary to carefully choose the management information which will be exchanged on a regular basis. In a preferred embodiment, two MIB variables are selected to be regularly audited: the Notification Sequence Number and EMS agent sysUpTime. The Notification Sequence Number will be explained in greater detail below. The EMS agent sysUpTime is a time (e.g., in hundredths of a second) elapsed since the EMS agent 6 or subagent which implements the EMS-MIB 10 was last re-initialized. Note that there is a sysUpTime MIB variable defined in standard SNMP MIB-11, but the behavior of that variable is not defined clearly in master-subagent architecture. To avoid confusion, it is preferable to define an equivalent sysUpTime variable in this management MIB.

Data Auditing

Delivery of unsolicited notifications sent by the EMS agent 6 over UDP transport is not guaranteed. If notifications are lost, the NMS 12 needs to audit the EMS-NE 10 to resynchronize its NE inventory, State and Active Alarm Tables 36, 38 and 40 (FIG. 5). In order to use the notification mechanism to quickly report noteworthy network events, it is particularly important to recover lost data.

In accordance with the present invention, the EMS-MIB 10 (FIG. 4) includes one or more notification log table(s) 24 providing respective fields for storing each of the above-described notification types, parameters and variable bindings, indexed by the respective transmitted Notification Sequence Number (TxNSN). This is a generic notification log scheme that accommodates all of the notification categories for the present invention, including improved access through indexing the notification log table 24 with the TxNSN. All specific notification variable bindings are preferably logged in the same order as in their MIB definition, except the TxNSN as it is the index of the notification log table(s) 24.

Each EMS agent 6 is preferably enabled to record notifications, in the respective notification log table(s) 24, for a minimum period of 'x' minutes, where x is the maximum possible poll cycle value for the NMS 12. This ensures that the log table 24 does not overflow before the next poll by the NMS 12.

The principal features and advantages of this audit strategy in accordance with the invention are:

Include a unique Transmitted Notification Sequence Number (TxNSN) in all notifications. This enables the NMS 12 to detect out-of-sequence or missing notifications and initiate recovery polls with minimum delay. The present invention effectively overlays SNMP with a protocol that uses unique sequence numbers to compensate for unreliable transport. The NMS 12 preferably processes notifications in the sequential order of the TxNSN's and discards duplicates. This also helps the NMS 12 to assess how many notifications it has received, and compare it with how many the EMS agent 6 appears to have sent;

The notification log table 24 in the EMS-MIB 10 is indexed by the TxNSN of sent notifications to enable the NMS 12 to quickly retrieve a record corresponding to the missed notification;

The EMS agent 6 provides the Current Notification Sequence Number 22 to the NMS 12 (e.g. during a start-up of the NMS 12 or on recovery of communications between the NMS 12 and EMS agent 6) to detect and query any notifications that were lost;

The NMS 12 can use the notification format definition to retrieve the variable bindings in their respective order. The EMS agent 6 can store the notification variable bindings in the notification log table 24 in the same order as in the notification definition. However, optional variable bindings are not guaranteed to be present, and the NMS 12 is preferably able to deal with 'noSuchInstance' error returns for some variable bindings when it issues a polling request to retrieve all of the variable bindings associated with a missing notification; and The notification log table(s) 24 are preferably read-only to the NMS 12, so the EMS agent 6 does not have to make any special provisions to coordinate multiple NMSs 12. This method in accordance with the invention is therefore flexible and evolvable because it is readily adaptable for use with new notification categories.

Initial Data Synchronization

The following subsections discuss the MIB data required by the NMS 12 to perform data synchronization to initialize after start up, and after an EMS agent 6 restarts/reboots. This data is required for large scale synchronization between the NMS-MIB 16 and EMS-MIB 10. Initial data synchronization is used primarily for initial synchronization. Notifications and the notification log table(s) are used thereafter to maintain synchronization on an ongoing basis.

NE Inventory Data

The NMS 12 needs to obtain a list of network elements 4 that are in the EMS domain 8 along with their key attributes. This information is derived from the NE inventory table 30 of the EMS-MIB 10. The NMS 12 needs to retrieve this data for initial synchronization, and after each communications loss.

The NMS 12 can issue a series of polling requests to the EMS-agent 6 and retrieve data to fill the NE inventory table 30. It is also possible to selectively retrieve the data concerning a specific NE 4 by specifying the NE name as an index of a polling request. Note that the NE inventory table 30 is primarily used to identify the NEs 4 that are in the EMS agent's domain 8. Any change to the domain 8 is preferably reflected in this table by removing an entry on receipt of a de-enrol request, and creating a new entry on receipt of an enrol request. The EMS agent 6 preferably operates to ensure that the NE inventory table 30 is accurate and current after restarts.

Active Alarm Status Information

The active alarm table 26 of the EMS-MIB 10 provides a consolidated list of all of the alarms currently outstanding against the managed elements in the EMS-domain 8. For every outstanding alarm (e.g., an alarm that has been raised, but not cleared), all of the variable bindings mentioned in the alarm notification section above are available.

The NMS 12 uses this data to perform initial synchronization of the active alarm table 40 of the NMS-MIB 16 after an EMS agent 6 restarts, and also while recovering from a OAM communication loss. The active alarm table 26 is preferably organized such that the NMS 12 can selectively retrieve all alarms pertaining to a specific NE 4. After the initial synchronization phase, the NMS 12 uses notifications and the notification log table(s) 24 to deal with ongoing updates. However, the notification log table(s) 24 containing the alarm update information cannot be used for initial synchronization, and there is a possibility of discarding data after a prolonged OAM communications loss.

The NMS 12 can issue a series of polling requests to the active alarm table 26, in order to retrieve outstanding alarm data from any NE 4 in the EMS-domain 8. When an alarm condition is cleared, the corresponding entry is removed from the table 26 and an entry is added when a new alarm is raised. The EMS agent 6 operates to ensure that table 26 is accurate and up-to-date after EMS agent 6 restarts, and the index values need not be preserved over restarts. However, it is preferable to provide the same notification IDs for all outstanding alarms after restarts.

State Information

The NMS 12 polls the state information table 32 of the EMS-MIB 10 to synchronize the operational state, administrative state, and presence or absence of "unknown" status condition of all NEs 4 in the EMS-domain 8. The state information table 32 of the EMS-MIB 10 is used by the NMS 12 for initial synchronization of the corresponding table 38 of the NMS-MIB 16, and after recovering from a communications loss. During normal operations, state change notifications and the corresponding notification log table 24 entries communicate the NE state information to the NMS 12. The state information table 30 is preferably always kept up-to-date irrespective of when an NMS 12 uses this data.

Exemplary Walk-throughs

Walk-throughs of exemplary management actions to illustrate behaviors of EMS agents 6 and NMS 12 in accordance with the present invention are now presented.

Communications Loss Between NMS and EMS

As a byproduct of periodic audit polls, the NMS 12 can detect communications loss between the EMS agent 6 and itself when transmitted polling requests time out with no response. An NMS 12 may be programmed to wait a few minutes and retry to determine if there is a persistent link problem. Once the NMS 12 determines that there is a communications loss problem, it can operate on the basis that all of the faults-related data previously communicated by the EMS agent 6 is no longer accurate. As a result, the NMS 12 changes all of the NEs 4 in the EMS domain 8 to "unknown" status and clears all outstanding alarms. The NMS 12 continues to send polling requests at a predetermined frequency, and, during this cycle, if the polling requests come back with appropriate responses, the NMS 12 determines that the communications loss problem with the EMS agent 6 has been resolved, and restores the current NE 4 data in the NMS-MIB 16 by polling the EMS-MIB 10. The NMS 12 detects differences with respect to the list of NEs 4 before and after a communications loss scenario and removes those NEs 4 that are no longer in the EMS-domain 8.

EMS Agent Restarts

Figure 6:
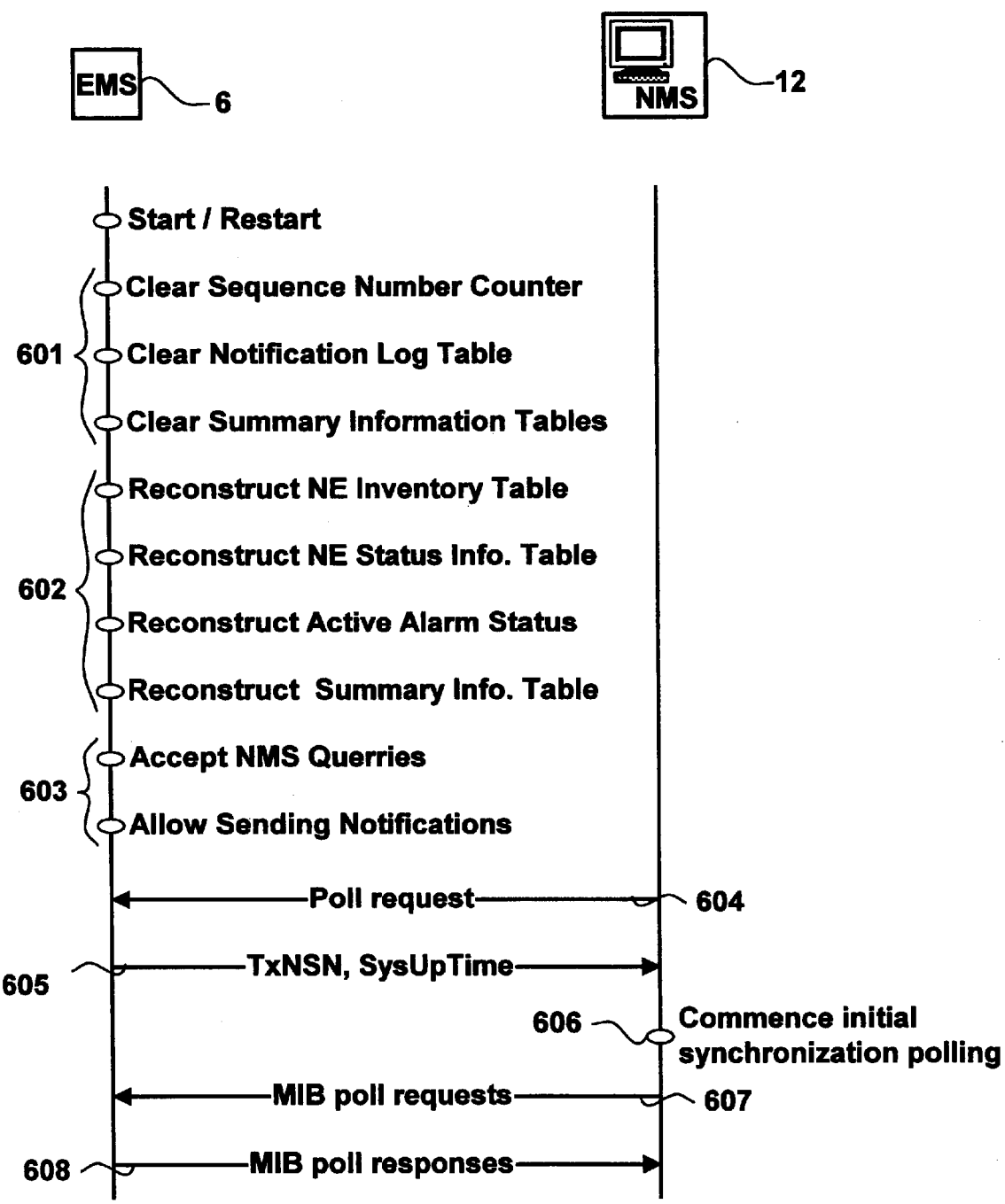
FIG. 6 schematically illustrates EMS and NMS behavior following starting and/or restarting an EMS, in accordance with an embodiment of the present invention.

FIG. 6 schematically illustrates EMS agent 6 and NMS 12 behavior following starting and/or restarting an EMS agent 6, in accordance with an embodiment of the present invention. Exemplary steps in this process are:

601. The EMS agent 6 clears the value of the current Notification Sequence Number 22, and the notification log tables 24. It may also clear all state and alarm summary information tables 26, 28, 32, and reconstruct them later by interacting with the NEs 4;

602. When an EMS agent 6 restarts, it ensures that all of the summary information, such as the NE inventory table 30, NE state information table 32 and the active alarm table 26 are accurate and up to date. While it is constructing or validating these tables, the EMS agent 6 preferably ignores any NMS polling requests and does not respond until an accurate collection of the NE inventory, state and alarm information tables 26–32 is available. This is to avoid sending a burst of notifications towards the NMS during the restart sequence;

603. After reconstructing the summary data, the EMS agent 6 accepts polling requests and sends responses, reports all subsequent events to the NMS 12 and logs the subsequent events in the notification log table 24;

604. A polling request sent by the NMS 12 is accepted by the EMS AGENT 6;

605. The EMS AGENT 6 responds to the poll request with sysUpTime and TxNSN, which inform the NMS 12 that the EMS AGENT 6 is functional again;

606. The NMS 12 begins MIB polling to resynchronize with the EMS MIB; and

607. The EMS AGENT 6 responds to the polling requests with the requested information extracted from the EMS MIB.

Sending An Alarm Raise Notification

Figure 7:
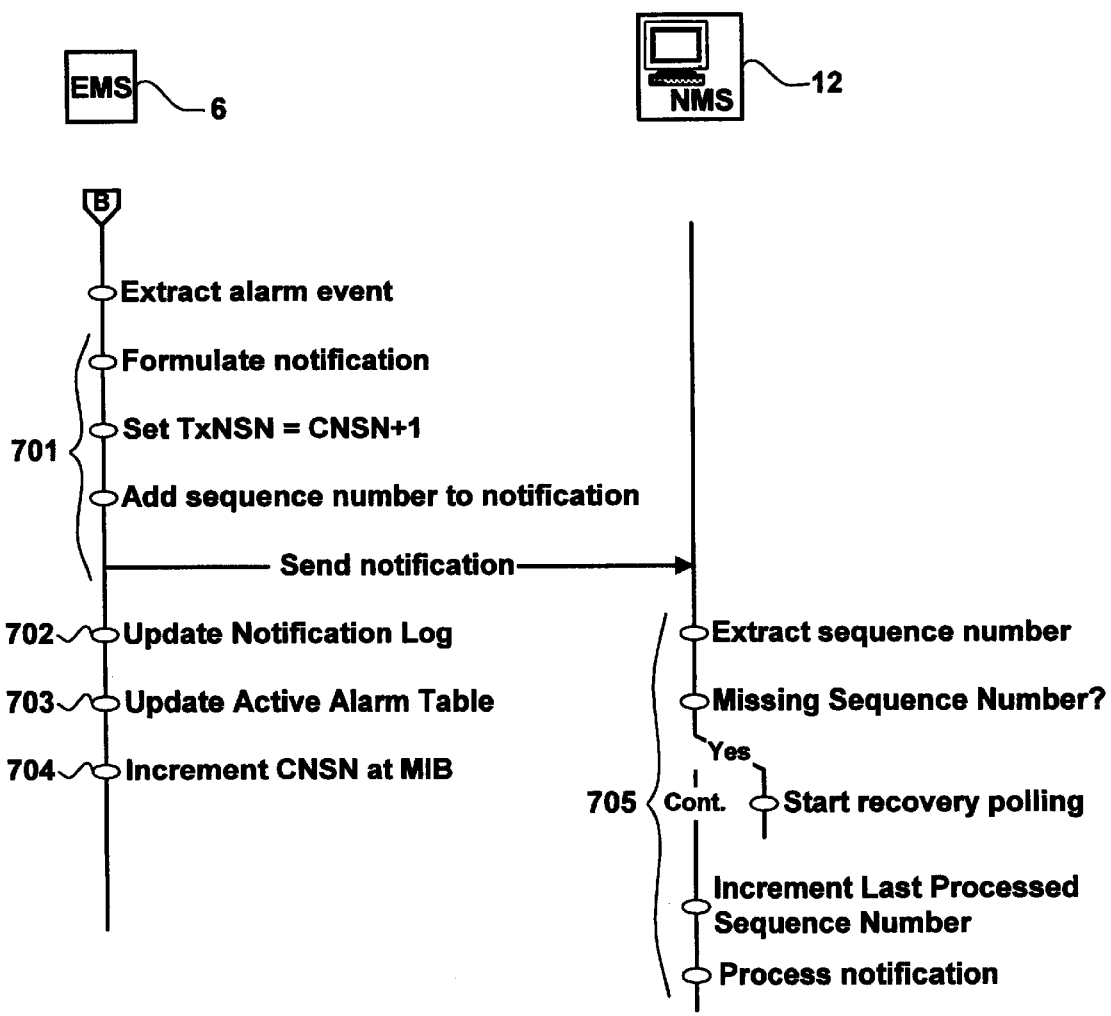
FIG. 7 schematically illustrates EMS and NMS behavior following detection of an alarm event, in accordance with an embodiment of the present invention.

FIG. 7 schematically illustrates EMS and NMS behavior following detection of an alarm event. In accordance with an embodiment of the present invention, the following steps are performed:

701. The EMS agent 6 formulates and sends the Notification with all relevant fields. Note that the TxNSN is set equal to the current notification sequence number 22 plus one, and included as a variable binding;

702. Entries are made in the notification log table(s) 24 for backup of the sent notification;

703. The active alarm table 26 is updated;

704. The current Notification Sequence Number 22 in the EMS-MIB 10 is updated; and

705. The NMS extracts the TxNSN from each received notification to ensure that the received TxNSNs are sequential. It initiates a recovery poll if a gap in the TxNSNs is detected. If no gap in the sequence numbers is detected, the NMS 12 increments the last processed Notification Sequence Number 34 and processes the alarm notification.

Sending An NE Enrol Notification

Figure 8:
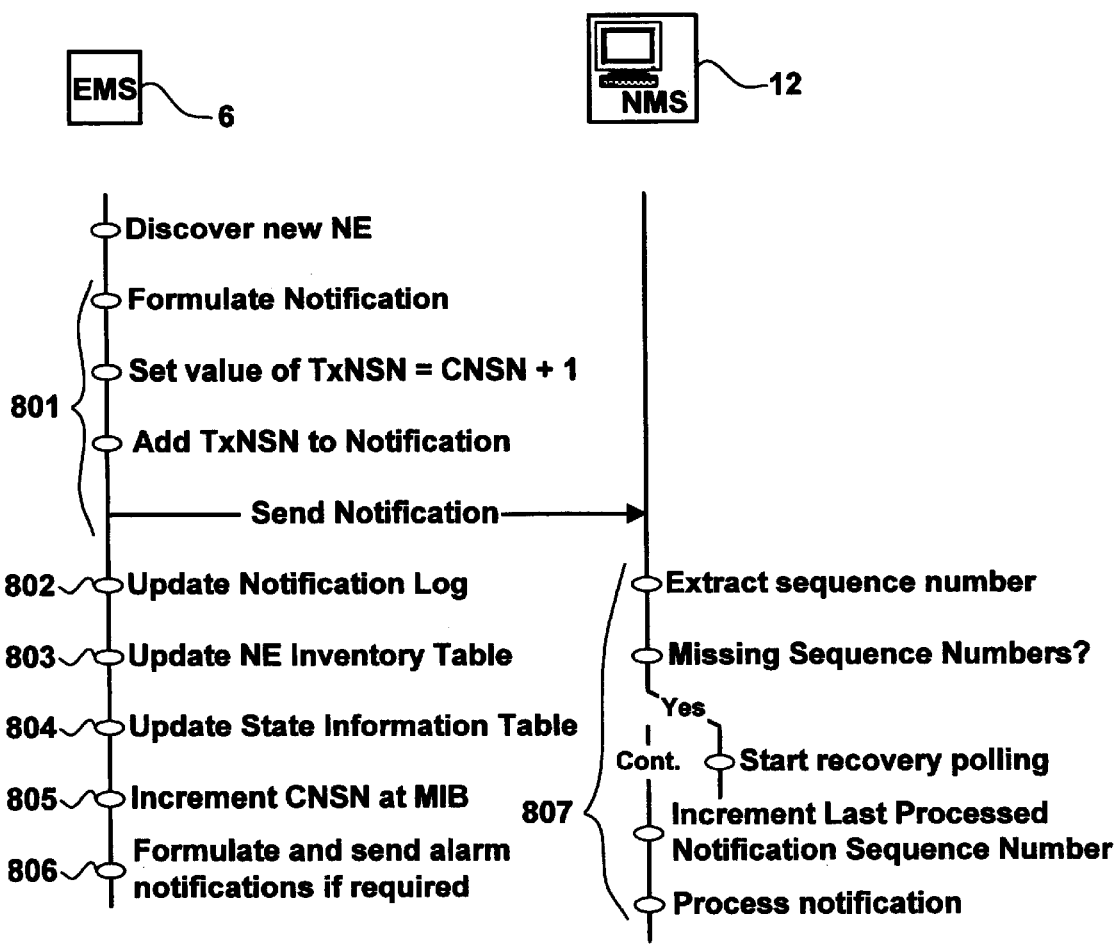
FIG. 8 schematically illustrates EMS and NMS behavior following discovery of a new NE, in accordance with an embodiment of the present invention.

FIG. 8 schematically illustrates EMS and NMS behavior following discovery of a new NE, in accordance with an embodiment of the present invention. The following steps are performed in order:

801. The EMS agent 6 formulates and sends the NE Enrol Notification with all relevant data. Note that the TxNSN is set equal to the current Notification Sequence Number 22 plus one, and included as a variable binding in the notification;

802. Entries are added to the notification log table(s) 24 for backup;

803. The NE inventory table 30 is updated;

804. The state information table 32 is updated;

805. The current Notification Sequence Number 22 in the EMS-MIB 10 is updated;

806. An alarm raise notification is sent, as described above with reference to FIG. 7, if required; and

807. The NMS 12 extracts the TxNSN from the received notification and determines whether it is in sequence. The NMS initiates a recovery poll if the notifications are out of sequence. If notifications are in sequence, the NMS increments the value of the last processed Notification Sequence Number 34 and processes the notification.

NMS Reconnect

Figure 9:
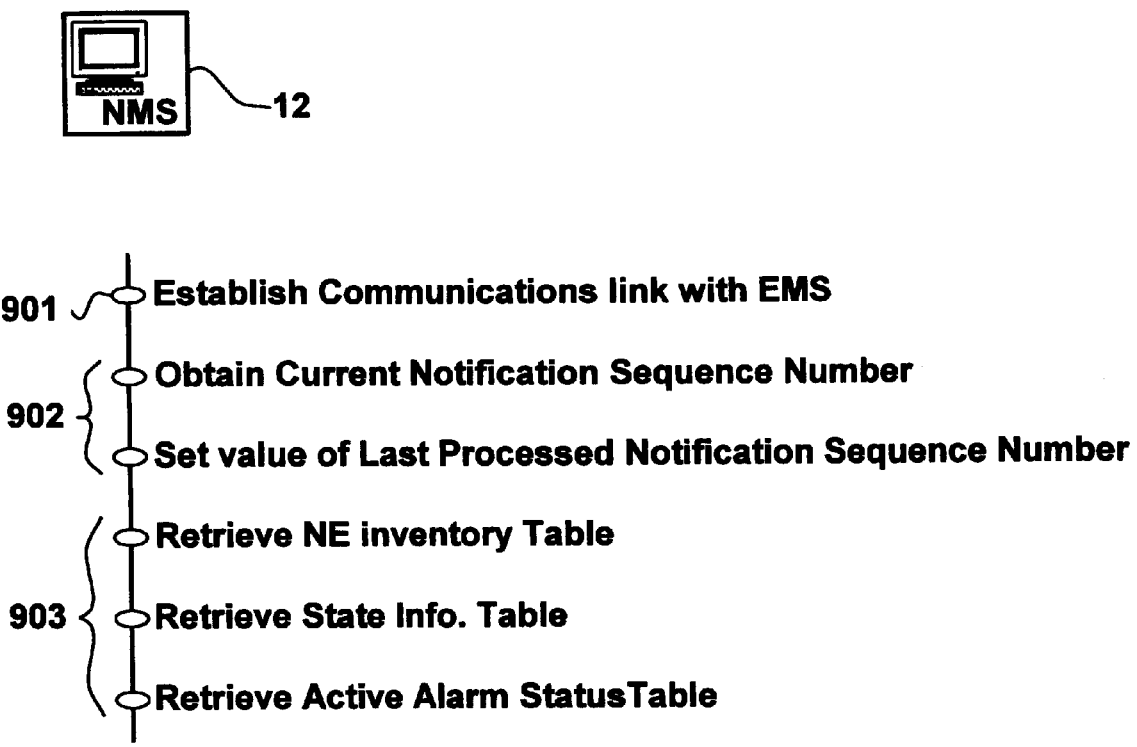
FIG. 9 schematically illustrates NMS behavior following establishment and/or reinstatement of a communications link between an EMS and an NMS, in accordance with an embodiment of the present invention.

FIG. 9 schematically illustrates a walk-through that covers both an NMS 12 connect with the EMS agent 6 for a first time, and reconnection after recovering from a communications loss. The sequence of steps in the resynchronization procedure is as follows:

901. The NMS 12 establishes a communication link with the EMS agent 6.

902. Once the NMS 12 establishes communications with the EMS agent 6, the NMS 12 polls the EMS-MIB 10 to obtain the current Notification Sequence Number 22. This value is used to set the last processed Notification Sequence Number 34 in the NMS-MIB 16;

903. The NMS 12 polls the EMS to retrieve data from the NE inventory table 30, the state information table 32, and the active alarm table 26;

It is possible for the NMS 12 to distinguish brief versus prolonged periods of communications loss with the EMS agents 6 and avoid retrieving the all the information from the relevant tables if only a few notifications were lost during the period when there was no communication.

The EMS agent 6 is not significantly impacted by this initialization process, and it can continue with its regular operations, substantially uninterrupted.

NE Unknown Status Recovery

Figure 10:
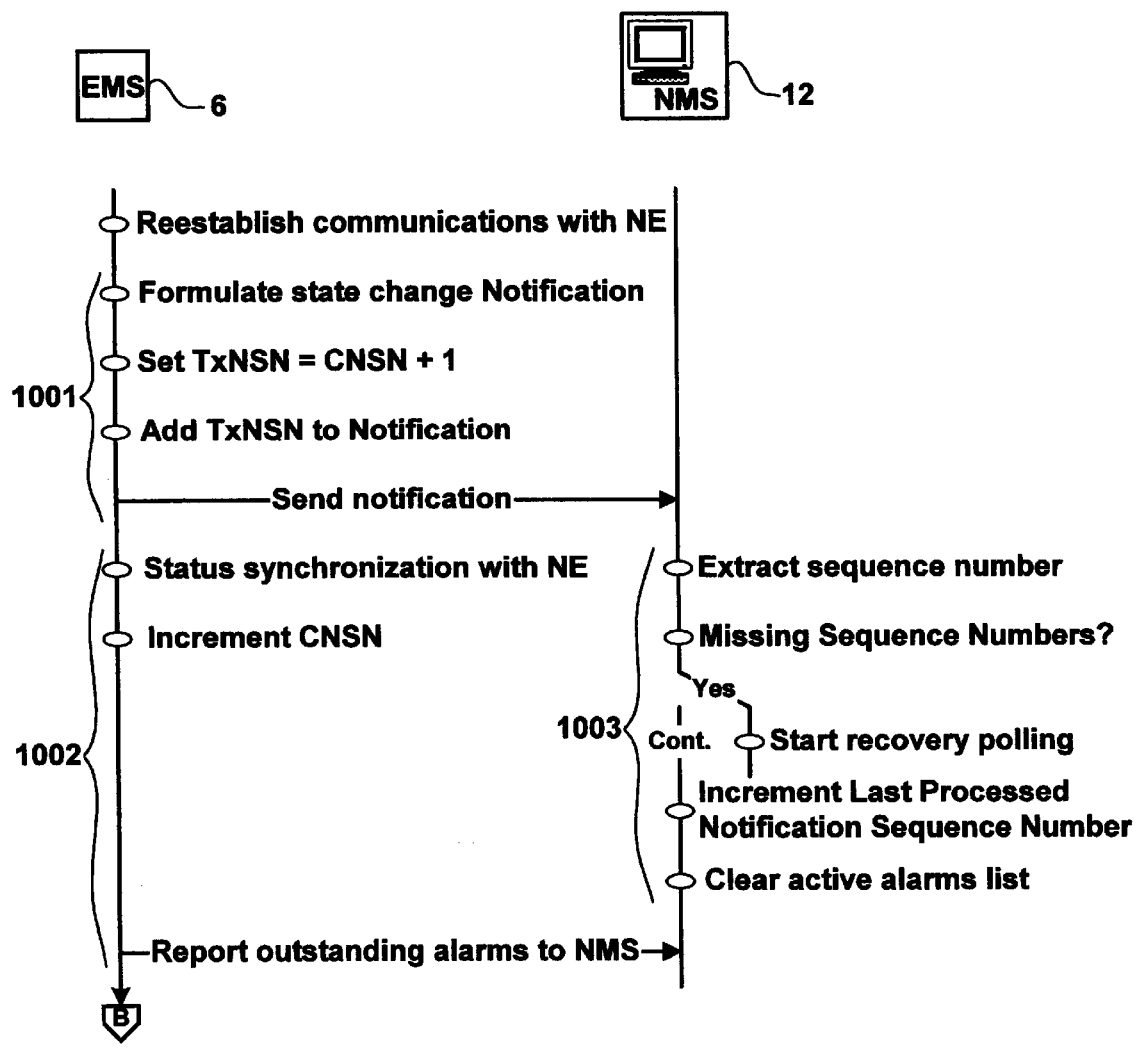
FIG. 10 schematically illustrates EMS and NMS behavior following establishment and/or establishment of a communications link between an EMS and an NE, in accordance with an embodiment of the present invention.

FIG. 10 schematically illustrates EMS and NMS behavior following establishment and/or reinstatement of a communications link between an EMS agent 6 and an NE 4, in accordance with the invention. The sequence of steps is as follows:

1001. When an EMS agent 6 detects that it can re-establish communications with an NE 4 (not shown) that was previously declared to have an "unknown" status, the EMS agent 6 formulates and sends a corresponding state change notification to the NMS 12;

1002. The EMS agent 6 then performs status synchronization procedures with the NE 4, updates the CNSN 22, and reports any outstanding alarms to the NMS 12 via notifications. It is not considered sufficient to simply update the active alarm table 26 and not send an alarm raise notification after restoring communication with the NE 4. Alarm raise notifications are sent as described above; and 1003. The NMS 12 clears its list of previously active alarms against the NE 4 after notification of a recovery from an "unknown" status, and then receives and processes any new alarm notifications. As described above, the NMS 12 ensures that received notifications are in proper sequence and initiates recovery polling as required.

Recovery Polling

Figure 11:
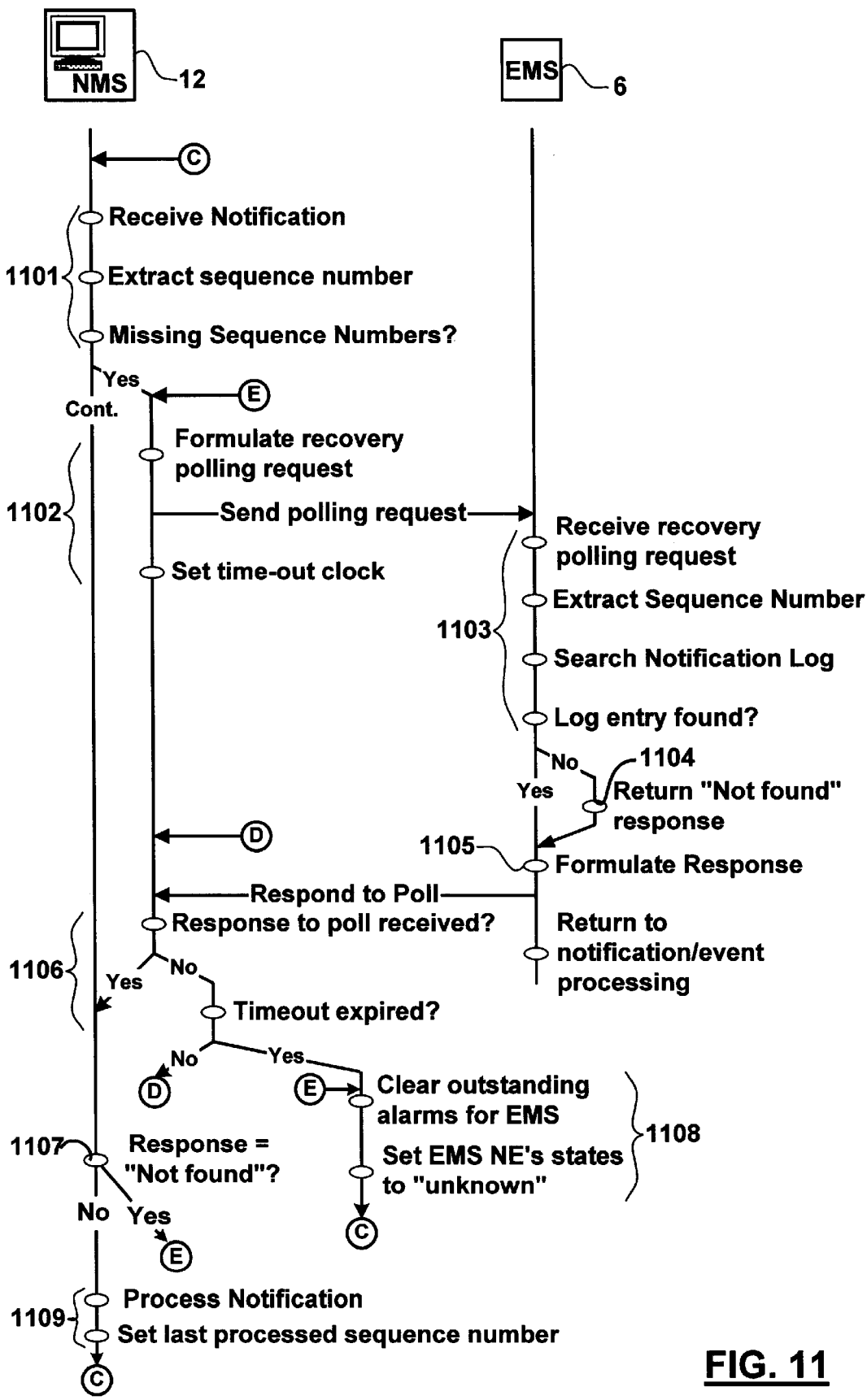
FIG. 11 schematically illustrates NMS and EMS behavior during a recovery polling process.

FIG. 11 schematically illustrates the behavior of the NMS 12 and the EMS 6 during an exemplary recovery polling process when the NMS 12 detects a missing TxNSN. The sequence of steps is as follows:

1101. When the NMS 12 receives a notification message from EMS agent 6, the NMS 12 extracts the TxNSN of the received notification and compares it with TxNSNs of previously received notifications to determines whether there any TxNSNs are missing;

1102. If a missing TxNSN is detected, the NMS 12 formulates a recovery polling request containing the missing TxNSN and sends the polling request to the EMS agent 6. The NMS 12 also initializes a time-out clock to limit a time spent waiting for a response to the recovery poll request;

1103. On receipt of the recovery poll request, the EMS agent 6 extracts the missing TxNSN and searches its notification log table 24 (FIG. 4) for a log entry corresponding to the missing TxNSN;

1104. If a corresponding log entry is found, thee EMS agent 6 formulates a polling response including the (missing) TxNSN and the information retrieved from the corresponding log entry in the notification log table 24. The EMS agent 6 then sends the response through the unreliable signaling environment;

1105. If a corresponding log entry is not found, the EMS agent 6 formulates a notification log entry "not found" response and returns the response.

1106. Meanwhile, the NMS 12 monitors the time-out clock and waits for receipt of a response to the recovery poll request.

1107. If a response notification is received prior to expiry of the time-out period, the response is examined to determine if the it indicates that the missing notification was not found. If the response indicates that the notification was found, the response is processed (step 1109), but if the response indicates that the notification was not found, the NMS proceeds as if the timeout period had expired;

1108. If the time-out period expires prior to receipt of a response notification, the NMS 12 clears all outstanding alarms for the EMS agent 6, and sets the status of all NEs managed by the EMS agent 6 to "unknown". The NMS 12 then periodically formulates and sends a new recovery polling request to attempt to resynchronize with the EMS agent 6, as explained above.

Although the above walk-throughs address network management as if there were a one-to-one correspondence between the NMS 12 and an EMS agent 6, it will be understood by those skilled in the art that the normal relationship is one-to-many and the walk-throughs described above actually take place in parallel with similar processes occurring between the NMS 12 and other EMS agents 6. Consequently, variables such as the last processed sequence number and the current notification sequence number are maintained for each EMS agent in an NMS domain.

The embodiment(s) of the invention described above is(are) intended to be exemplary only. The scope of the invention is therefore intended to be limited solely by the scope of the appended claims.

We claim:

1. A method of enabling carrier-grade network fault monitoring in an unreliable network transport environment, the method comprising the steps of:
    a) receiving notifications sent through the unreliable network transport environment, each notification having a unique transmitted notification sequence number (TxNSN);
    b) detecting a missing notification by comparing respective TxNSNs of received notifications to detect a missing notification sequence number; and
   sending a polling request for transmission of a response containing data related to the detected missing notification.

2. A method as claimed in claim 1, wherein the notifications are sent when management data is received from a managed resource within a predetermined management domain; and a notification is formulated to communicate the received management data.

3. A method as claimed in claim 2, wherein formulating a notification indicative of the received management data comprises formulating a notification corresponding to a selected one of a set of predetermined notification types.

4. A method as claimed in claim 3, wherein the set of predetermined notification types comprises any one or more of: Enrol Notifications; De-enrol Notifications; State Change Notifications; Attribute Change Notifications; and Alarm Notifications.

5. A method as claimed in claim 2, further comprising a step of providing a first management information base including: a current notification sequence number; and a notification log.

6. A method as claimed in claim 5, further comprising the steps of assigning the value of the current notification sequence number, plus one, to a transmitted next sequence number (TxNSN) of a notification; and subsequently updating the current notification sequence number (CNSN).

7. A method as claimed in claim 5, wherein the first management information base further includes information respecting one or more of: an identity of a managed resource within the management domain; a state of the managed resource; and alarm notifications.

8. A method as claimed in claim 5, further comprising, in conjunction with transmission of a notification, a step of recording contents of the transmitted notification in the notification log.

9. A method as claimed in claim 1, further comprising a step of providing a second management information base including: a last processed notification sequence number; information respecting an identity of managed resources within a predetermined domain; and, a state of each managed resource.

10. A method as claimed in claim 1, further comprising the steps of:
   d) processing a received notification if its corresponding transmitted next sequence number (TxNSN) is consecutively larger than a value of a last processed notification sequence number; and
   e) upon processing the notification, setting the last processed notification sequence number equal to the TxNSN.

11. A method as claimed in claim 10, further comprising the step of discarding a received notification if its corresponding TxNSN is less than a value of the last processed notification sequence number.

12. A method as claimed in claim 9, further comprising, during either one of a start-up operation, or recovery of communications through the unreliable network transport environment, the steps of:
   i) sending a polling request including a value of the current notification sequence number; and
   ii) upon receipt of a response including the value of the current notification sequence number, initializing the last processed notification sequence number to equal the value of the current notification sequence number.

13. A method as claimed in claim 12, further comprising, following initialization of the last processed notification sequence number, the steps of:
   iii) sending a polling request for transmission of responses containing data in the first management information base; and
   iv) updating the second management information base with information contained in subsequently received responses containing data from the first management information base.

14. A system for providing carrier-grade fault monitoring in an unreliable network transport environment, the system comprising:
   a) a first manager operatively connected for bi-directional communication through the unreliable network transport environment, the first manager being adapted for formulating and sending notifications through the unreliable network transport environment, each notification having a unique transmitted notification sequence number (TxNSN);
   b) a second manager operatively connected for bi-directional communication with the first manager over the unreliable network transport environment, the second manager comprising:
      i) detection means responsive to notifications received from the first manager to detect a missing notification by comparing the respective TxNSNs of received notifications to detect a missing notification sequence number; and
      ii) polling means responsive to detection of a missing notification to send a polling request to the first manager for transmission in a response message of data related to the missing notification.

15. A system as claimed in claim 14, wherein the first manager comprises:
   i) an interface operatively connected for reception of management data from a managed resource within a management domain of the first manager; and
   ii) a notification entity responsive to the received management data for formulating a notification indicative of the received management data.

16. A system as claimed in claim 15, wherein the notification entity is responsive to the management data to formulate a notification corresponding to a selected one of a set of predetermined notification types.

17. A system as claimed in claim 16, wherein the set of predetermined notification types comprises any one or more of: Enrol Notifications; De-enrol Notifications; State Change Notifications; Attribute Change Notifications; and Alarm Notifications.

18. A system as claimed in claim 15, wherein first manager further comprises a first management information base including: a current notification sequence number; and a notification log.

19. A system as claimed in claim 18, wherein the notification entity is adapted to increment the current notification sequence number to a next higher value after assigning the value of the current notification sequence number to a TxNSN of a notification.

20. A system as claimed in claim 18, wherein the first management information base further includes information respecting one or more of: an identity of a managed resource within the management domain; a state of the managed resource; and a log of notifications sent by the first manager.

21. A system as claimed in claim 18, wherein, following transmission of a notification to the second manager, the first manager is adapted to record contents of the transmitted notification in the notification log.

22. A system as claimed in claim 14, wherein the second manager further comprises a second management information base including: a last processed notification sequence number; information respecting an identity of managed resources within a domain of the first management system; and a state of each managed resource.

23. A system as claimed in claim 22, wherein the second management information base further comprises information respecting alarms raised by the first manager.

24. A system as claimed in claim 22, wherein the second manager is further adapted to:
   g) process a received notification if its corresponding TxNSN is consecutively larger than a value of the last processed notification sequence number; and
   h) upon processing the notification, increment the last processed notification sequence number to a next larger consecutive value.

25. A system as claimed in claim 24, wherein the second manager is further adapted to discard a received notification if its corresponding TxNSN is less than a value of the last processed notification sequence number.

26. A system as claimed in claim 22, wherein, during either one of a start-up operation of the second manager, or recovery of communications between the second manager and the first manager, the second manager is further adapted to:
  r) control the polling means to send a polling request to the first manager for transmission of a response including the value of the current notification sequence number; and
  s) upon subsequent reception of the response including the value of the current notification sequence number, initialize the last processed notification sequence number to equal the value of the current notification sequence number received in the response.

27. A system as claimed in claim 26, wherein, following initialization of the last processed notification sequence number, the second manager is adapted to:
  t) control the polling means to send a polling request to the first manager for transmission of responses containing information extracted from the first management information base; and
  u) update the second management information base with information contained in subsequently received responses containing information extracted from the first management information base.

28. An element manager for enabling carrier-grade fault monitoring in an unreliable network transport environment, the element manager comprising:
  c) interface means for receiving management data from a managed resource within a management domain of the element manager; and
  d) a notification means responsive to the received management data for formulating a notification indicative of the received management data, the notification including a respective unique transmitted notification sequence number.

29. An element manager as claimed in claim 28, wherein the notification means is responsive to receipt of the management data by formulating a notification corresponding to a selected one of a set of predetermined notification types.

30. An element manager as claimed in claim 29, wherein the set of predetermined notification types comprises any one or more of: Enrol Notifications; De-enrol Notifications; State Change Notifications; Attribute Change Notifications; and Alarm Notifications.

31. An element manager as claimed in claim 28, wherein the element manager further comprises a management information base including: a current notification sequence number; and a notification log.

32. An element manager as claimed in claim 31, wherein the notification means is adapted to update the current notification sequence number after assigning the value of the current notification sequence number, plus one, to a TxNSN of a notification.

33. An element manager as claimed in claim 31, wherein the management information base further includes information respecting one or more of: an identity of a managed resource within the management domain; a state of the managed resource; and alarm notifications sent by the element manager.

34. An element manager as claimed in claim 31, wherein, following transmission of a notification, the element manager is adapted to record contents of the transmitted notification in the notification log.

35. An element manager as claimed in claim 28, wherein the interface means of the element manager is further adapted to detect a plurality of predetermined alarm events, and the notification entity is further and adapted to:
  c) formulate and send a notification indicative of the alarm event.

36. A network manager for enabling carrier-grade fault monitoring in an unreliable network transport environment, the network manager comprising:
  a) detection means for detecting notifications received through the unreliable network transport environment, each notification including a respective unique transmitted notification sequence number (TxNSN), the detection means being adapted to detect a missing notification by comparing the respective TxNSNs of the received notifications to detect a missing notification sequence number; and
  polling means responsive to detection of a missing notification for sending a polling request for transmission of a response containing data related to the missing notification.

37. A network manager as claimed in claim 36, wherein the network manager further comprises a management information base including: a last processed notification sequence number; information respecting an identity of managed resources within a domain of an element manager subservient to the network manager; and a state of each managed resource.

38. A network manager as claimed in claim 37, wherein the management information base further comprises information respecting alarms raised in respect of each managed resource.

39. A network manager as claimed in claim 37, wherein the network manager is further adapted to:
  c) process a received notification if its corresponding TxNSN is greater than a value of the last processed notification sequence number; and
  d) upon processing the notification, set the last processed notification sequence number equal to a value of the TxNSN.

40. A network manager as claimed in claim 39, wherein the network manager is further adapted to discard a received notification if its TxNSN is less than a value of the last processed notification sequence number.

41. A network manager as claimed in claim 37, wherein, during either one of a start-up operation of the manager, or recovery of communications through the unreliable network transport environment, the network manager is further adapted to:
  e) control the polling means to send a polling request to an element manager for transmission of a response including the value of the current notification sequence number; and
  f) upon subsequent receipt of the response including the value of the current notification sequence number, initialize the last processed notification sequence number to equal the value of the current notification sequence number received from the element manager in the response.

42. A network manager as claimed in claim 41, wherein, following initialization of the last processed notification sequence number, the network manager is adapted to:
  g) control the polling means to send a polling request to an element manager for transmission of responses containing data respecting an identity and status of each managed resource within a domain of the element manager; and h) update the management information base with information contained in subsequently received responses containing data respecting an identity and status of each managed resource within a domain of the element manager.

43. A simple network management protocol (SNMP) for providing carrier-grade network fault monitoring in an unreliable network transport environment using element managers for managing network devices and network managers for managing element managers, comprising:

a) interface means operative on each element manager for receiving management data from a managed resource within a management domain of the element manager;

b) notification means responsive to the received management data operative on each element manager for formulating a notification indicative of the received management data, the notification including a respective unique transmitted notification sequence number;

c) means operative on each network manager for receiving notifications sent through the unreliable network transport environment, each notification having a unique transmitted notification sequence number (TxNSN);

d) means operative on each network manager for detecting a missing notification by comparing respective TxNSNs of received notifications; and means operative on each network manager for sending a polling request for transmission of a response containing data related to a detected missing notification.

44. A simple network management protocol as claimed in claim 43 wherein the element managers and the network managers respectively maintain management information bases that are adapted to store information required for the carrier-grade network fault monitoring.

45. A simple network management protocol as claimed in claim 44 wherein the information stored in the management information bases is compliant with Open Systems Interconnection (OSI) or International Telecommunications Union-Telecommunications Standards Sector (ITU-TS) recommendations.

* * * * *